United States Patent
Furst et al.

(10) Patent No.: US 9,916,399 B2
(45) Date of Patent: Mar. 13, 2018

(54) DYNAMIC OPTIMIZATION OF DETAILED FLAT DESIGN BASED ON DESIRED FINAL STRUCTURAL ATTRIBUTES

(71) Applicant: Xerox Corporation, Norwalk, CT (US)

(72) Inventors: Michael R. Furst, Penfield, NY (US); Charles Donahue Rizzolo, Fairport, NY (US); William J. Hannaway, Webster, NY (US); Stephen C. Morgana, Rochester, NY (US); Reiner Eschbach, Webster, NY (US)

(73) Assignee: Xerox Corporation, Norwalk, CT (US)

(*) Notice: Subject to any disclaimer, the term of this patent is extended or adjusted under 35 U.S.C. 154(b) by 983 days.

(21) Appl. No.: 14/269,543

(22) Filed: May 5, 2014

(65) Prior Publication Data
US 2015/0317411 A1 Nov. 5, 2015

(51) Int. Cl.
G06F 17/50 (2006.01)
B65D 5/02 (2006.01)

(52) U.S. Cl.
CPC ............ *G06F 17/50* (2013.01); *B65D 5/0254* (2013.01); *G06F 2217/38* (2013.01)

(58) Field of Classification Search
None
See application file for complete search history.

(56) References Cited

U.S. PATENT DOCUMENTS

| | | | |
|---|---|---|---|
| 3,902,655 A | 9/1975 | Huffman | |
| 5,353,390 A | 10/1994 | Harrington | |
| 6,117,061 A | 9/2000 | Popat et al. | |
| 6,134,018 A | 10/2000 | Dziesietnik et al. | |
| 7,765,469 B2 | 7/2010 | Sembower et al. | |
| 7,941,465 B2 | 5/2011 | Gombert et al. | |
| 7,983,792 B2 | 7/2011 | Gombert et al. | |
| 8,160,992 B2 | 4/2012 | Gombert et al. | |
| 8,170,706 B2 | 5/2012 | Gombert et al. | |
| 8,170,709 B2 | 5/2012 | Puissant | |
| 8,174,720 B2 | 5/2012 | Gombert et al. | |
| 8,869,083 B1 | 10/2014 | Morgana et al. | |
| 8,915,831 B2 | 12/2014 | Walker et al. | |
| 2007/0041035 A1 | 2/2007 | Sembower et al. | |
| 2009/0278843 A1 | 11/2009 | Evans | |

(Continued)

*Primary Examiner* — Cedric Johnson
(74) *Attorney, Agent, or Firm* — Fox Rothschild LLP

(57) ABSTRACT

A method and system for creating a customized package design. Package design and preference information related to a shape of the package design is received. The preference information includes user-specified information related to one or more levels of one or more structural attributes of the package design. A detailed design is generated that incorporates the user-specified information and a detailed design file is generated and output. Generation of the detailed design includes identifying functional elements associated with the package that correspond to the user-specified information and altering at least one physical characteristic of the identified functional elements based upon the preference information, and incorporating the altered physical characteristic into the detailed design. A determination can be made as to whether the altered detailed design satisfies any constraints associated with the package being design, and the detailed design file can be updated accordingly.

21 Claims, 9 Drawing Sheets

(56) References Cited

U.S. PATENT DOCUMENTS

| | | | |
|---|---|---|---|
| 2009/0282782 A1* | 11/2009 | Walker | B65D 5/0254 |
| | | | 53/410 |
| 2009/0287632 A1* | 11/2009 | Gombert | G06N 5/02 |
| | | | 706/55 |
| 2010/0058943 A1 | 3/2010 | Bober | |
| 2011/0052888 A1 | 3/2011 | Eschbach et al. | |
| 2011/0054849 A1* | 3/2011 | Walker | G06F 17/50 |
| | | | 703/1 |
| 2011/0116133 A1 | 5/2011 | Walker et al. | |
| 2011/0149337 A1 | 6/2011 | Goetz et al. | |
| 2014/0038801 A1 | 2/2014 | Morgana et al. | |
| 2014/0038802 A1 | 2/2014 | Clark et al. | |
| 2014/0040319 A1* | 2/2014 | Morgana | G06F 17/5068 |
| | | | 707/803 |
| 2014/0067104 A1 | 3/2014 | Osterhout | |
| 2014/0121800 A1 | 5/2014 | Morgana et al. | |
| 2014/0129018 A1 | 5/2014 | Morgana et al. | |
| 2014/0139849 A1 | 5/2014 | Eschbach et al. | |

\* cited by examiner

| FINAL STRUCTURE ATTRIBUTE | DESIRED LEVEL | IMPORTANCE WEIGHT (1=LEAST IMP, 100=MOST IMP) |
|---|---|---|
| EASE OF ASSEMBLY | ○ ⦿ ○<br>LOW DEFAULT HIGH | 50 |
| ASSEMBLY PERMANENCE | ○ ○ ⦿<br>LOW MED DEFAULT | 50 |
| JOINED EDGE TIGHTNESS OF FIT | ○ ⦿ ○<br>LOW DEFAULT HIGH | 50 |
| STRUCTURAL INTEGRITY | ○ ⦿ ○<br>LOW DEFAULT HIGH | 50 |

FIG. 8

| FINAL STRUCTURE ATTRIBUTE | TAB SHAPE | TAB SIZE | TAB/ SLOT INTERF. | #TABS/ LENGTH |
|---|---|---|---|---|
| EASE OF ASSEMBLY | | + | − | − |
| ASSEMBLY PERMANENCE | + | | + | |
| JOINED EDGE TIGHTNESS OF FIT | + | | + | + |
| STRUCTURAL INTEGRITY | | + | + | + |

DYNAMIC OPTIMIZATION OF DETAILED FLAT DESIGN BASED ON DESIRED FINAL STRUCTURAL ATTRIBUTES

BACKGROUND

The present disclosure relates to package design. More specifically, the present disclosure relates to dynamic optimization of a detailed flat design for a package based upon user-specified structural attributes for the package.

There has been significant interest in the manufacture of personalized packaging for small volume applications. Methods and systems for creating personalized packaging are described in previous patent filings such as U.S. patent application Ser. No. 13/563,071, titled "Package Definition System," and U.S. patent application Ser. No. 13/904,377, titled "Dynamic Bridge Generation in Package Definition Systems." The disclosures of each of these patent applications are fully incorporated herein by reference. These systems allow an end user to create a package or similar three-dimensional structure by defining dimensions and providing some information about functionality.

As users desire additional options and increased customization, there is a need for continued improvement of automated package customization systems. For example, typical package creation systems include default detailed features such as lids, bottoms, edges, and tabs/slots. Changing one or more of these features can cause problems with one or more other features as there is a complex relationship between the many detailed design options and achieving a desired package, i.e., a package that is highly functional while still providing a well manufactured and reliable package.

SUMMARY

In one general respect, the embodiments disclose a method of creating a package design comprising a two-dimensional representation of a three-dimensional structure having a plurality of facets. The method includes receiving an indication of an initial package design, receiving preference information related to a shape of the initial package design, the preference information comprising user-specified information related to one or more levels of one or more structural attributes of the initial package design, generating a detailed design that incorporates implementation of the user-specified information, and generating and outputting a detailed design file based upon the detailed design. In the method, generating the detailed design can includes automatically identifying a plurality of functional elements associated with the three-dimensional structure that correspond to the user-specified information related to one or more levels of one or more structural attributes; for at least one of the identified functional elements, altering at least one physical characteristic based upon at least a portion of the preference information, incorporating the at least one altered physical characteristic into the detailed design; determining whether the detailed design meets one or more constraint conditions associated with the initial package design; if the detailed design meets the one or more constraint conditions, maintaining the at least one altered physical characteristic; and if the detailed design does not meet the one or more constraint condition, omitting the at least one altered physical characteristic from the detailed design.

The method can also include altering at least one physical characteristic comprises altering a tab and slot design associated with the initial package design. Altering the tab and slot design can include determining a tab shape and size based upon the incorporated at least a portion of the preference information, determining a desired tab and slot fit based upon the incorporated at least a portion of the preference information, determining a slot size based upon the determined tab shape, size and desired tab and slot fit, and determining a tab and slot spacing based upon the incorporated at least a portion of the preference information.

The method can also include receiving the preference information further comprises receiving one or more relative importance weights for one or more of the attributes of the initial package design.

In the method as described above, generating the detailed design can include defining one or more functions for determining final product attributes based upon at least one of the user-specified information related to one or more finishing levels and the user-specified input information defining one or more relative importance weights. Similarly, generating a detailed design can further include defining lower and upper limits for each input variable for the one or more functions, the lower and upper limits being defined based upon at least one of the user-specified information related to one or more finishing levels and the user-specified input information defining one or more relative importance weights. The method can also include calculating a set of design points that incorporates a sum of the user-specified relative importance weights, wherein the set of design points are determined such that the package design satisfies any constraints associated with the type of package being designed.

Additionally, the method can further include accessing the detailed design to apply a set of rules that apply the cut lines, fold lines and tabs/slots to the substrate.

In another general respect, the embodiments disclose a method including displaying a user interface related to a design of a three-dimensional structure. The user interface includes a user-selectable area for altering one or more levels of one or more structural attributes of a package to be designed, and a user-selectable area for altering one or more importance weights associated with each of the one or more structural attributes. The method further includes receiving an indication of an initial package design from a user accessing the user-interface, receiving preference information related to a shape of the initial package design from the user, the preference information comprising user-specified information related to the one or more levels of one or more structural attributes of the initial package design and user-specified information related to one or more importance weights, creating a package design comprising a two-dimensional representation of the three-dimensional structure having a plurality of facets.

Creating the package design can include generating a detailed design that incorporates implementation of the user-specified information, and generating and outputting a detailed design file based upon the detailed design. In the method, generating the detailed design can include automatically identifying a plurality of functional elements associated with the three-dimensional structure that correspond to the user-specified information related to one or more levels of one or more structural attributes; for at least one of the identified functional elements, altering at least one physical characteristic based upon at least a portion of the preference information; incorporating the at least one altered physical characteristic into the detailed design; determining whether the detailed design meets one or more constraint conditions associated with the initial package design; if the detailed design meets the one or more constraint conditions, maintaining the at least one altered physical characteristic in the detailed design; and if the detailed design does not meet the one or more constraint condition, omitting the at least one altered physical characteristic from the detailed design; and In another general respect, the embodiments disclose a system for creating a package design comprising a two-dimensional representation of a three-dimensional structure having a plurality of facets, the system including a processor configured to perform various functions and operations and a non-transitory computer readable medium in communication with the processor. The computer readable medium can include one or more programming instructions for causing the processor to receive an indication of an initial package design, receive preference information related to a shape of the initial package design, the preference information comprising user-specified information related to one or more levels of one or more structural attributes of the initial package design, generate a detailed design that incorporates implementation of the user-specified information, and generate and output a detailed design file based upon the detailed design.

Additionally, the one or more programming instructions for generating the detailed design further include one or more instructions for causing the processor to automatically identify a plurality of functional elements associated with the three-dimensional structure that correspond to the user-specified information related to one or more levels of one or more structural attributes; for at least one of the identified functional elements, alter at least one physical characteristic based upon at least a portion of the preference information; incorporate the at least one altered physical characteristic into the detailed design; determine whether the detailed design meets one or more constraint conditions associated with the initial package design; if the detailed design meets the one or more constraint conditions, maintain the at least one altered physical characteristic; and if the detailed design does not meet the one or more constraint condition, omit the at least one altered physical characteristic from the detailed design.

BRIEF DESCRIPTION OF THE DRAWINGS

FIG. 8 depicts a sample user interface for providing a user an input mechanism for defining various package attributes.

DETAILED DESCRIPTION

Figure 1:
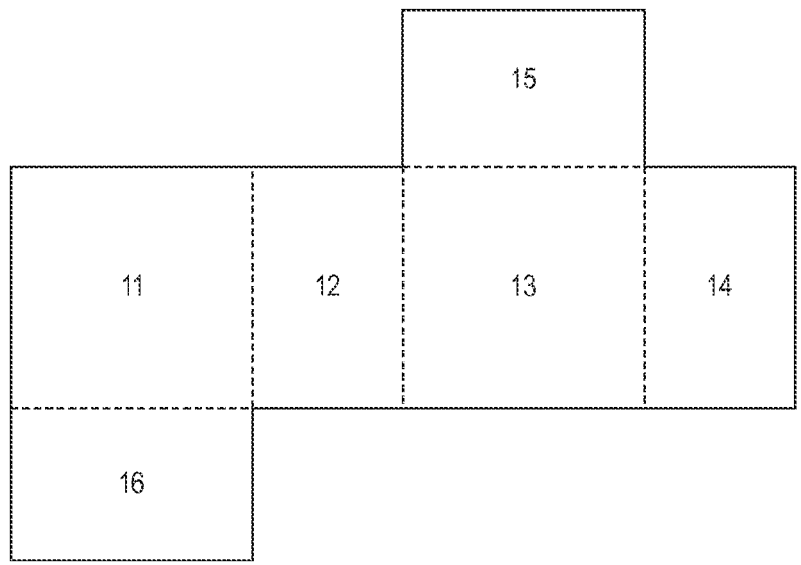
FIG. 1 depicts an example of a package flat.

This disclosure is not limited to the particular systems, devices and methods described, as these may vary. The terminology used in the description is for the purpose of describing the particular versions or embodiments only, and is not intended to limit the scope.

As used in this document, the singular forms of any word, and defining adjectives such as "a," "an" and "the," each include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

A "package generation system" is a machine or group of machines that combines the features of a print device with one or more tools for imparting a cut, crease, and/or perforation on a printed substrate so that the substrate may be folded into a three-dimensional package, or other structures.

A "package flat" refers to a generally two-dimensional structure having two or more facets formed on a substrate by cut lines (including perforations) and/or fold lines (including creases and/or score lines). The package flat also may include printed content on one or more of the facets. The flat may be removed from the substrate at the cut lines, and the flat may then be folded into a three-dimensional structure having two or more sides. The actual three-dimensional shape of the package is subsequently created by folding and connecting the facets that make up the flat. This imposes a variety of restrictions on the structure both in its two dimensional form, as well as in its three dimensional form. The substrate is typically (but not necessarily) a paper material, such as cardstock, cardboard, or paper having sufficient thickness to provide structural support when folded into a three-dimensional shape.

A "package" refers to a three-dimensional structure having two or more sides constructed from a package flat and sized and shaped accordingly for holding one or more objects. For example, a package may be sized and shaped to hold a small object for presentation such as a gift or memento. The overall size dimensions, and corresponding shape, may be determined based upon the specific object.

An "attribute," "structural attribute" or a "package attribute" refers to one or more functional aspects of a structural aspect or component of a package or other three-dimensional structure formed by cutting, creasing and folding a two-dimensional substrate, such as ease of assembly and assembly permanence. Each attribute may have finishing level associated therewith. For example, for a particular package, the ease of assembly may have a high finishing level that indicates the package is easy to assemble. In order to achieve a particular desired level of finishing for a particular attribute, one or more physical characteristics of a package that contribute directly to that attribute may be adjusted or otherwise altered. For example, to achieve a high level of ease of assembly, one or more tab and slot pairs on the package can be adjusted such that the tabs fit easier into the slots, thereby reducing the overall effort required for assembling the package.

The present disclosure relates to an additional set of detailed structure design options and a new algorithm that would allow a user to optionally specify a relative level of selected final product attributes and relative importance weighting between those attributes. The new algorithm may be integrated within package generation software such that an optimum set of detailed design attribute options are available to maximize user-expressed preference information in the final package characteristics. For example, the slot-tab joining features may be altered during package design based upon a user's expressed desire for easy assembly.

Such an arrangement, and associated algorithm, provides a user of a package generation system with the ability to provide personalized preference information related to one or more features of a package being designed, including, for example, package appearance, package assembly difficulty and permanence, package reusability and other similar features. By providing the preference information, a user can impart their likes (e.g., easy assembly) into the package design without an understanding of how such an attribute change is implemented in the actual package design. The package design system can be programmed to interpret the user's preference information and potentially implement one or more alternative changes to the package design to implement the user's likes while still maintaining any required parameters of the package being designed. Thus, the package design system can produce a best compromise design incorporating as much of the user-specified preference information while still ensuring the required parameters of the package being designed are met.

Package production may be performed by a package generation system that is capable of performing printing operations on, and applying creases and cuts to, a substrate. The system also may perform other actions such as coating and/or stacking the substrate. Examples of automated package generation systems include those in the iGen® series of digital production printing presses, available from Xerox Corporation, in connection with corresponding finishing devices. Other systems may include smaller printing devices, such as a Xerox DocuColor® 250, or a digital cutter as offered by a variety of manufacturers.

One aspect in the creation of a package is that the printing device operates on a two dimensional sheet—i.e., a package flat. The actual three-dimensional shape of the package is subsequently created by folding and connecting the facets that make up the flat. Here it is understood that various types of folds may create a three-dimensional structure or shape in the language of this application. This imposes a variety of restrictions on the structure both in its two dimensional form, as well as in its three dimensional form. The substrate is typically a paper material, such as cardstock, cardboard, or paper having sufficient thickness to provide structural support when folded into a three-dimensional shape. However, other materials can also be used and are understood in the context of this disclosure.

FIG. 1 shows a common package flat 10, in this case a rectangular box, with a variety of facets 11-16 as they may be commonly envisioned by a human. Facet 15 may be a lid that can be opened when the flat is folded into a three-dimensional structure, while facet 16 may be a floor or base that generally remains closed and locked in place when the flat is folded into a three dimensional structure.

To define the package, a system may generate a user interface that allows a user to enter dimensional and functional information. The system may then use that information to create a package definition file, containing instructions for cut lines and fold lines that package generation equipment may use to construct the package flat. In the example of FIG. 1, the user may have entered dimensional information into the user interface such as height, width and depth. The user also may have provided functional requirements such as a lid and locking floor. The system may use this information to define the facets, and functional elements. Note that in the example of FIG. 1, the location of the lid and floor may vary, as the lid facet 15 could be attached to any side facet, as could the floor facet 16, without altering the resulting three-dimensional structure.

Functional elements may be, for example, facets or folds that have a functional property for the three dimensional structure, and may or may not be visible in the closed package. In general, functional elements may connect package faces, influence the assembly of the package and/or change a structural property of the assembled package as compared to the package flat. Examples of such properties include rigidity and dust protection. This document will use the term "tab" when referring to a functional element that connects with another element in a secure manner, such as with a tab-and-slot arrangement. It will use "flap" when referring to a functional element that covers a seam in a manner that allows it to easily be opened, and thus it may not substantially contribute to stability.

Figure 2:
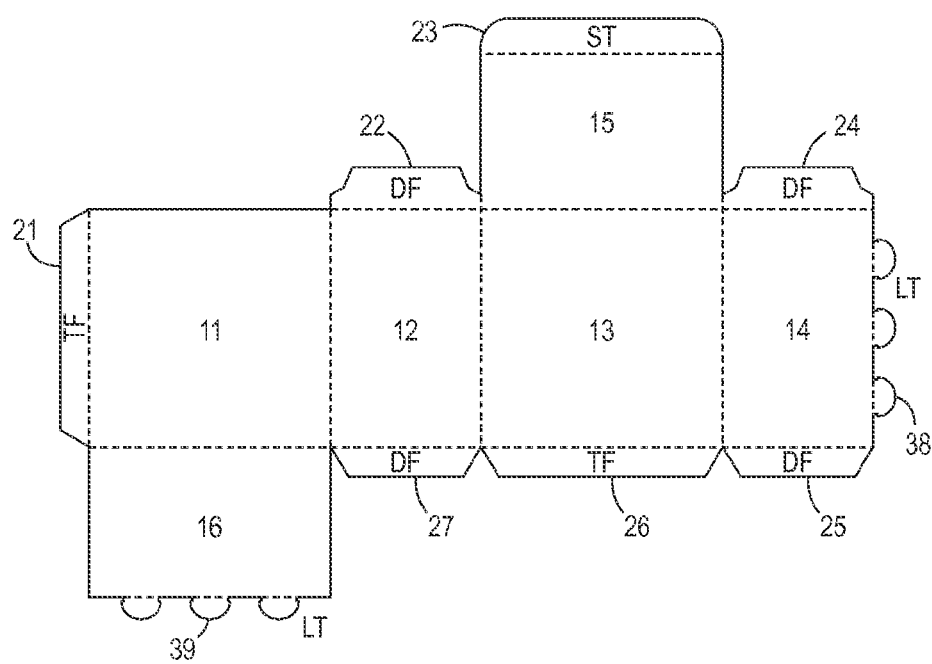
FIG. 2 depicts an example of a package flat with functional elements, all of which are symmetric with respect to their corresponding functional elements.

FIG. 2 shows the same three dimensional geometric shape of FIG. 1 mapped to a workable flat 10 with faces 11 through 16 and functional elements 21-27 and 38-39 representing connecting elements. In this illustration, the functional elements labeled DF 22, 24, 25 and 27 may be considered to be flaps, functional element ST 23 may be considered to be a sliding tab, functional elements FL 38 and 39 may be considered to be locking tab structures, each of which includes one or more locking tabs. Functional elements TF 21 and 26 may be considered to be tab flaps having, each of which includes a receiving slot structure comprised of a flap with one or more openings sized and positioned to receive the locking tabs when the flat is folded into a three dimensional structure. The dotted lines in FIG. 2 represent fold edges to which the package generation system may apply a crease or score in order to create an angle when the substrate is folded. The solid lines represent cut lines. When a package generation system produces the flat 10 from a substrate, it will cut the substrate along the cut lines and score, partially cut or impress the substrate along the fold lines. The substrate also may include printed content such as letters, numbers, graphics, barcodes, or other material that is printed on the substrate. Some or all of the printed content may be printed on the substrate before the substrate enters the package production device.

In FIG. 2, the tabs are symmetrically located with respect to their relevant fold edges. In other words, using an example the tabs of locking tab structure LT 39 are symmetrically located (i.e., identical spacing along the edge) with respect to the openings on tab flap 26. Symmetrical relationships also apply between the tabs of locking tab structure LT 38 and the receiving slot structure of tab flap TF 21, as well as sliding tab ST 23 and the cut edge of facet 11. However, this may not be the case for all structures. For example, if the package where intended to be a closed cube, or if it were a 3-sided column or 5-sided column, then a symmetrical relationship for all tabs/flaps could result in binding or imprecise matching when the flat is folded into a three-dimensional structure.

When determining a specific design for a package, the shape, design and integration of various physical components may have an impact on final attributes of the package being designed. For example, the attributes impacted by shape and design may include, but are not limited to, ease of assembly, whether or not the structure can be disassembled and reassembled without damaging the package, tightness and appearance of joined edges of the package, structural integrity, and other final attributes. For example, when designing a package, tab size, tab shape, number of tabs per length of edge, and tab/slot fit may all have an impact on final attributes of the package. A system defined package design may have a set of default tab and slot finishing levels such as current tab shape (e.g., locking or non-locking), a default tab/slot size, a default algorithm for determining number of tabs/slots per length of an edge.

Each of the finishing levels associated with a physical component of a package design may also be set such that any constraint conditions associated with the package are met. For example, a particular package may be designed to hold a specific amount of weight. The tab/slot design, as well as the design of other physical characteristics of the package, may be limited based upon these constraint conditions, e.g., the package design system may not allow a package design that will cause one or more of the constraint conditions to not be met. To obtain specific physical characteristics of a package that will satisfy a particular set of finishing levels, one or more functions may be used to determine the physical characteristics. Examples of such functions are described in greater detail in regard to FIGS. 3 and 4 below.

Figure 3:
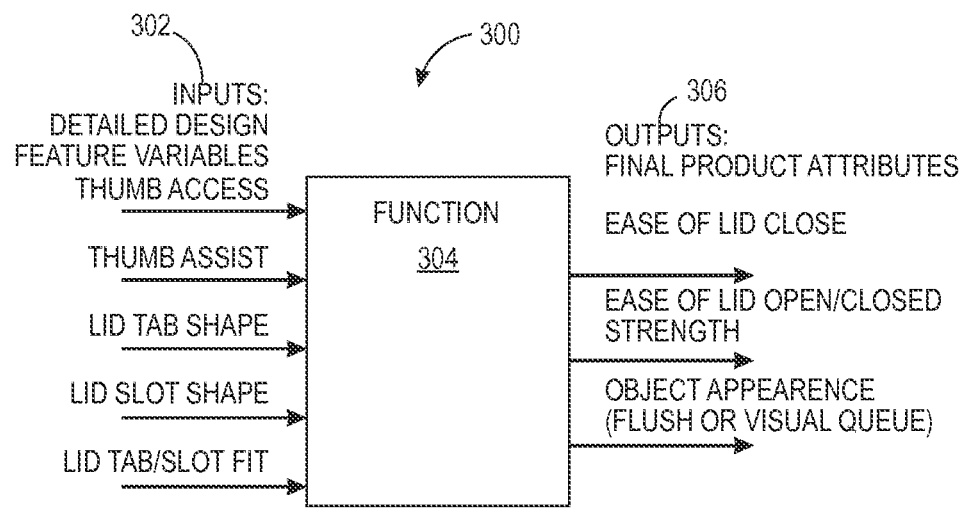
FIG. 3 depicts a sample input/output diagram for lid elements on final package attributes.

FIG. 3 illustrates a sample input/output diagram 300 illustrating how a package design and definition system may use various user-defined or system-defined inputs to determine various attributes for a functional element such as a lid. More specifically, FIG. 3 how each input may impact the final product attributes for the completed package. For example, various inputs 302 such as thumb access, thumb assist, lid tab shape, lid slot shape, and lid tab/slot fit may be configured as inputs to a specific design function 304. The package design system may receive a user-selected input of a particular package design characteristic from a user via a user interface. For example, the package design system may receive an input that the user has selected a particular type of lid, having a particular set of inputs 302. Alternatively, the package design system may receive a user request to produce a predetermined package design which may include, for example, a set of default inputs 302.

The design function 304 may be configured such that the package design system processes each specific input 302, and produces a set of output final product attributes 306. For example, the final product attributes may include ease of lid close, ease of lid open/closed strength, and object appearance. As one or more inputs 302 to function 304 are changes, one or more of the outputs 306 may change as well depending upon how impactful the change to the input is to the overall design and appearance of the final product or package.

Figure 4:
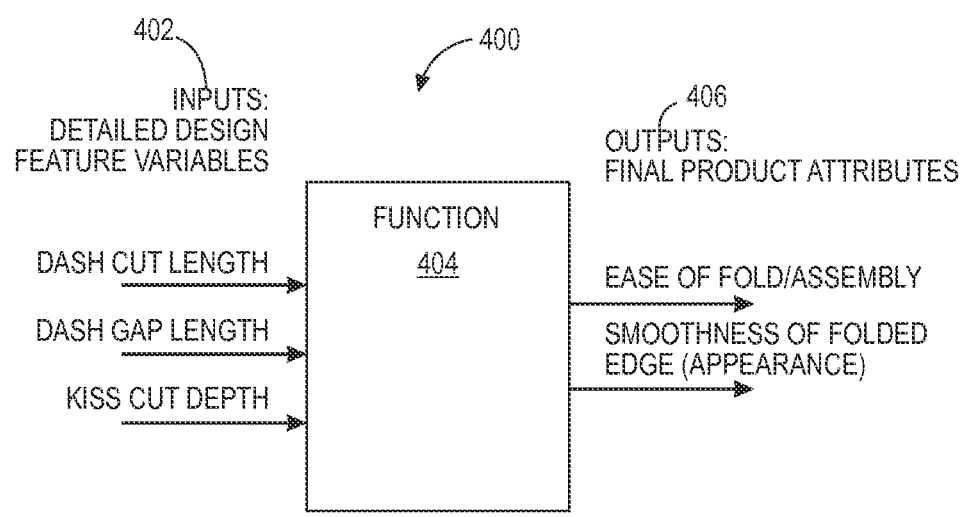
FIG. 4 depicts a sample input/output diagram for fold elements on final package attributes.

Similarly, FIG. 4 illustrates a sample input/output diagram 400 for fold elements, and how each specific input impacts the output of the final product attributes for the completed package. For example, various inputs 402 such as dash cut length, dash gap length and kiss cut depth may be configured as inputs to a specific design function 404. The design function 404 may be configured to process each specific input 402, and produce a set of output final product attributes 406. For example, the final product attributes 406 may include ease of fold/assembly and smoothness of folded edge. As one or more inputs 402 to function 404 are changed, one or more of the outputs 406 may change as well depending upon how impactful the change to the input is to the overall design and appearance of the final product or package.

It should be noted that, depending upon how the specific package design and assembly process is integrated, functions 304 and 404 may be the same package design function. Alternatively, the functions 304 and 404 may be separate and unique functions specifically designed for those specific aspects of the package design.

Figure 5:
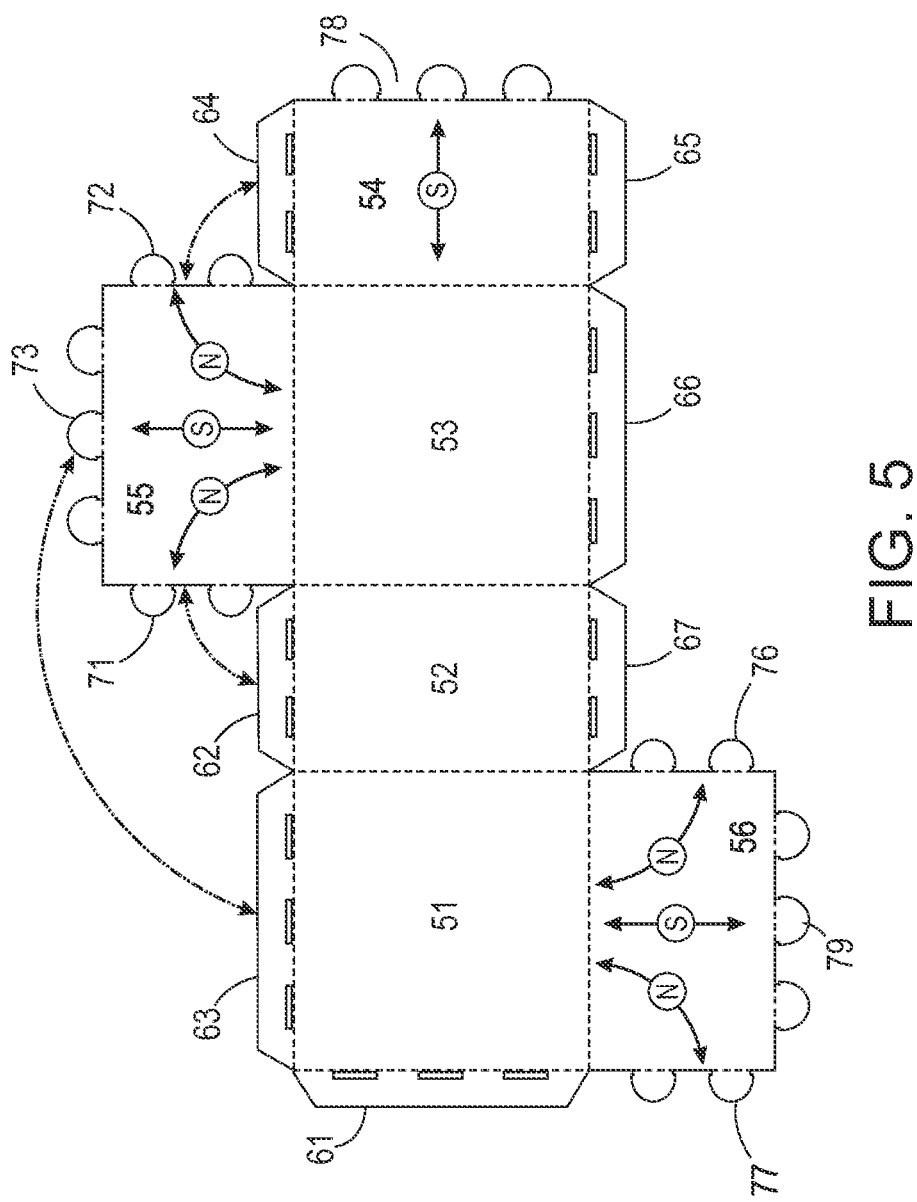
FIG. 5 depicts an example of a package flat with functional elements, some of which are non-symmetric with respect to their corresponding functional elements.

FIG. 5 shows an embodiment of a cube having no re-opening lid but instead a top 55 that locks into the sides 51-54, as does the bottom 56. Instead of a sliding tab, the top facet 55 includes a locking tab structure 73 containing tabs that are symmetrically located with respect to the openings on tab flap 63. Locking tabs 79 are also still symmetrically located with respect to the openings on tab flap 66, as are the tabs of tab structure 78 and the openings on tab flap 61. The tabs themselves also exhibit a symmetric shape, in that they contain the same features and dimensions along either side of a center line. Note that in the package flat, each of these sets of tabs (73, 78 and 79) is parallel to the fold edge of the facet to which the tabs are connected. (This relationship is illustrated by an "S" with arrows in FIG. 3.) Thus, these tabs can be positioned to be symmetric with respect to their receiving slots on a corresponding tab flap. However, to lock the top 55 and bottom 56 in place, additional locking tabs are included along additional sides of those facets. In particular, top facet 55 includes side locking tab structures 71 and 72 that are positioned to be received by receiving slots in tab flap 62 and 64. Bottom facet includes side locking tab structures 76 and 77 that are positioned to be received by receiving slots in tab flaps 65 and 67.

Figure 6:
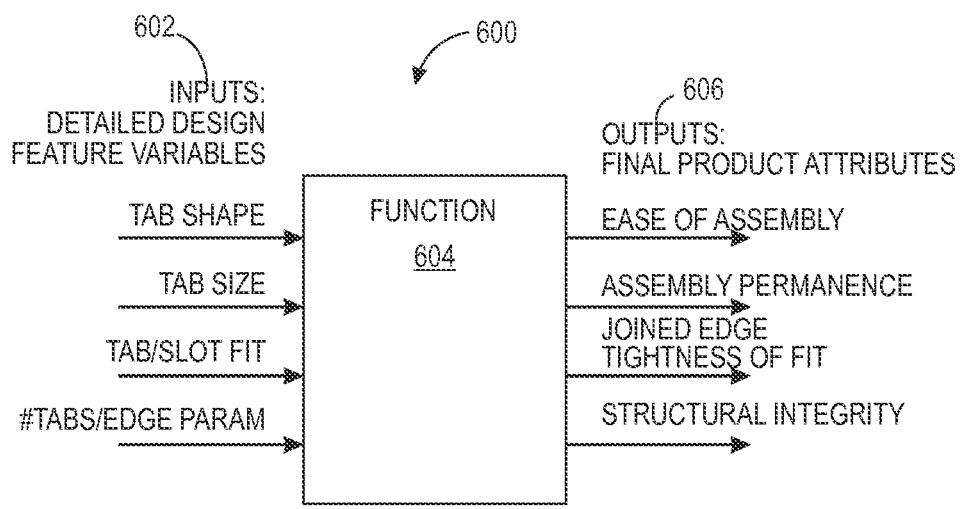
FIG. 6 depicts a sample input/output diagram for tab elements on final package attributes.

Similar to FIGS. 3 and 4, FIG. 6 illustrates a sample input/output diagram 600 for paired tab/slot elements such as those shown in FIG. 5, and how each specific input impacts the output of the final product attributes for the completed package. For example, various inputs 602 such as tab shape, tab size, tab/slot fit, and number of tabs/edge parameters may be configured as inputs to a specific design function 604. The design function 604 may be configured to process each specific input 602, and produce a set of output final product attributes 606. For example, the final product attributes 606 may include ease of assembly, assembly permanence, joined edge tightness of fit, and structural integrity. As one or more inputs 602 to function 604 are changed, one or more of the outputs 606 may change as well depending upon how impactful the change to the input is to the overall design and appearance of the final product or package.

According to various embodiments, a user may be provided with the option to alter one or more input parameters during design of a package as well as define a weight between parameters indicating which of the parameters is most important to the user. For example, the user maybe more concerned with ease of assembly than structural integrity, and want a design that can be quickly assembled rather than provide a sturdy package.

Figure 7:
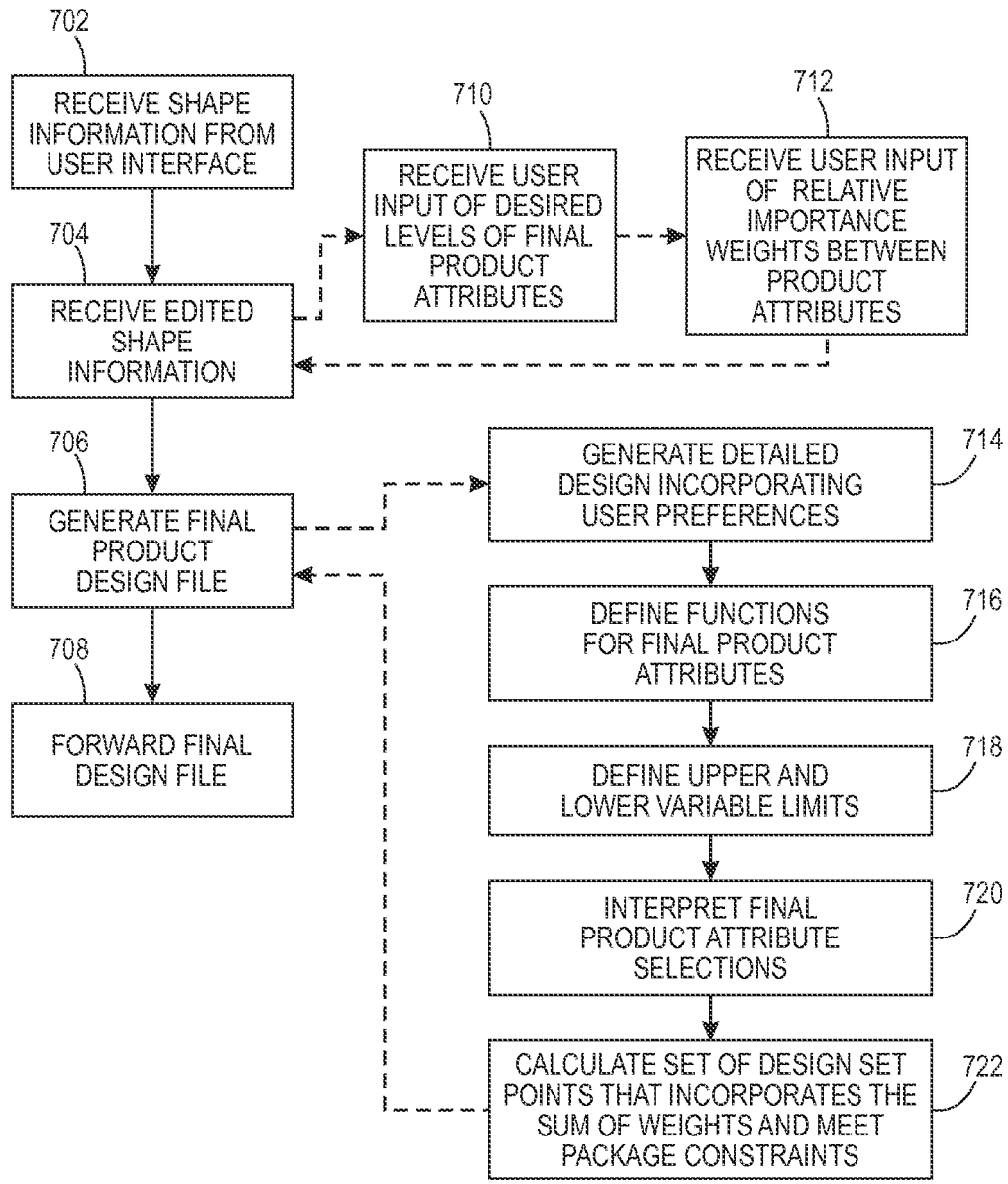
FIG. 7 is a flowchart showing an example of a package definition process according to an embodiment.

FIG. 7 illustrates a sample process for a package design system to design assembly information for a package including user-provided preference information according to an embodiment. As shown in FIG. 7, a basic process for designing a package may include a package design system receiving 702 shape information from a user interface, the shape information defining the overall finished shape of the package being designed. For example, the package design system may receive 702 information from a user to create a package shaped like a rectangular box having a particular set of dimensions such as side lengths and heights. The shape information may further include material type and thickness, a category of the package to be created (e.g., for shipping or for retail display), a model number (e.g., if the user has selected a system-designed package), and other related information that may be used by the package design system during the design of the package flat.

The package design system may further receive 704 preference information from the user related to changes to the overall shape of the package being designed. For example, the user may opt to alter the shape or size of one or more faces of the package. Based upon the user received and specified preference information, the design system may generate 706 a final product design file and forward 708 the product design file to one or more appropriate finishing machines. For example, the design system may forward 708 the product design file to a printer and an automated cutter.

According to the present disclosure, a user accessing the package design system may input various other information, such as final product attributes the user desires. As such, when the design system receives 704 the preference information to alter the shape of the package, the design system may further receive 710 user input of desired levels of final product attributes. For example, the design system may display a user interface similar to the screenshot of user interface 800 as shown in FIG. 8, prompting the user to input one or more preferences related to the final product attributes of the package being designed.

As shown in FIG. 8, the user may access the user interface 800 to alter one or more desired levels of finish as well as an importance weight for one or more final structure attributes for the package being created. For example, as shown in FIG. 8, the user may input their desired level 804 of various final structure attributes 802, including, but not limited to, ease of assembly, assembly permanence, joined edge tightness of fit, and structural integrity.

The package design system may alter a design of the package accordingly based upon a user-specified level 804 for a specific attribute 802. For example, as shown in FIG. 8, the user may select a desired level 804 such as low, medium, or high depending upon the attribute 802. Initially, the package design system may set each attribute to a default level based upon, for example, a type of package being created. The user may then access the user interface and change the level 804 of one or more attributes 802 to their desired level. If possible, the package design system may alter one or more physical characteristics associated with the package design to achieve one or more of the user-specified desired levels 804 of attribute finish, while still maintaining any constraint conditions associated with the package design.

Additionally, as shown in FIG. 8, the user may input an importance weight 806 for one or more attributes 802. As used herein, the importance weight may refer to user-specified number or value associated with an individual attribute 802. The package design system may use the user-specified importance weights to order the changes to the attributes from most important to the user to least important to the user. The package design system may then use this information to rank or sort adjustments to the physical characteristics of the package being designed that are implemented based upon user-specified changes to the level 804 of finish. Thus, if the package design system determines that a specific combination of changes determined based upon the user-specified levels 804 would result in one or more constraint conditions not being met, the package design system can order or rank the changes such that those changes associated with the highest importance weights are made first.

As shown in FIG. 8, the importance weight 806 may be on a scale such as, for example, a numeric scale from 1 to 100 where 1 is the least important and 100 is the most important. The design system may initially set each importance weight at a default, e.g., 50, where each specific attribute 802 is equally important to the final design. Alternatively, if the user selects a predesigned package that has, for example, a higher level 804 associated with ease of assembly, the importance weight 806 associated with ease of assembly may be set higher than the other importance weights. By accessing the user interface as shown in screenshot 800, the user may change these default settings to indicate that one or more attributes 802 are more important to the user during package design. For example, the user may set the importance level 806 associated with ease of assembly to 100, indicating that it is very important to the user, while setting structural integrity to a low value such as 10, indicating that structural integrity is not very important to the user.

Referring again to FIG. 7, the design system may receive 712 a user input or relative importance weights between each attribute. The design system may receive 712 the weighting information as a portion of the received 704 shape preference information, and incorporate both the user-specified level of final product attributes as well as the user specified importance weighting information into the generation 706 of the final product design.

Based upon the user-specified information related to the attribute levels and relative importance weight, the design system can generate 714 a detailed design file that includes one or more altered physical characteristics for functional elements making up the package. The altered physical characteristics may be determined to satisfy as many of the user preferences and user-defined attribute finish levels as possible without compromising any constraint conditions associated with the package being designed. In order to generate 714 the detailed design file, the package design system may automatically select and alter one or more physical characteristics for the package to be designed that correspond to the user-specific information.

Figure 9:
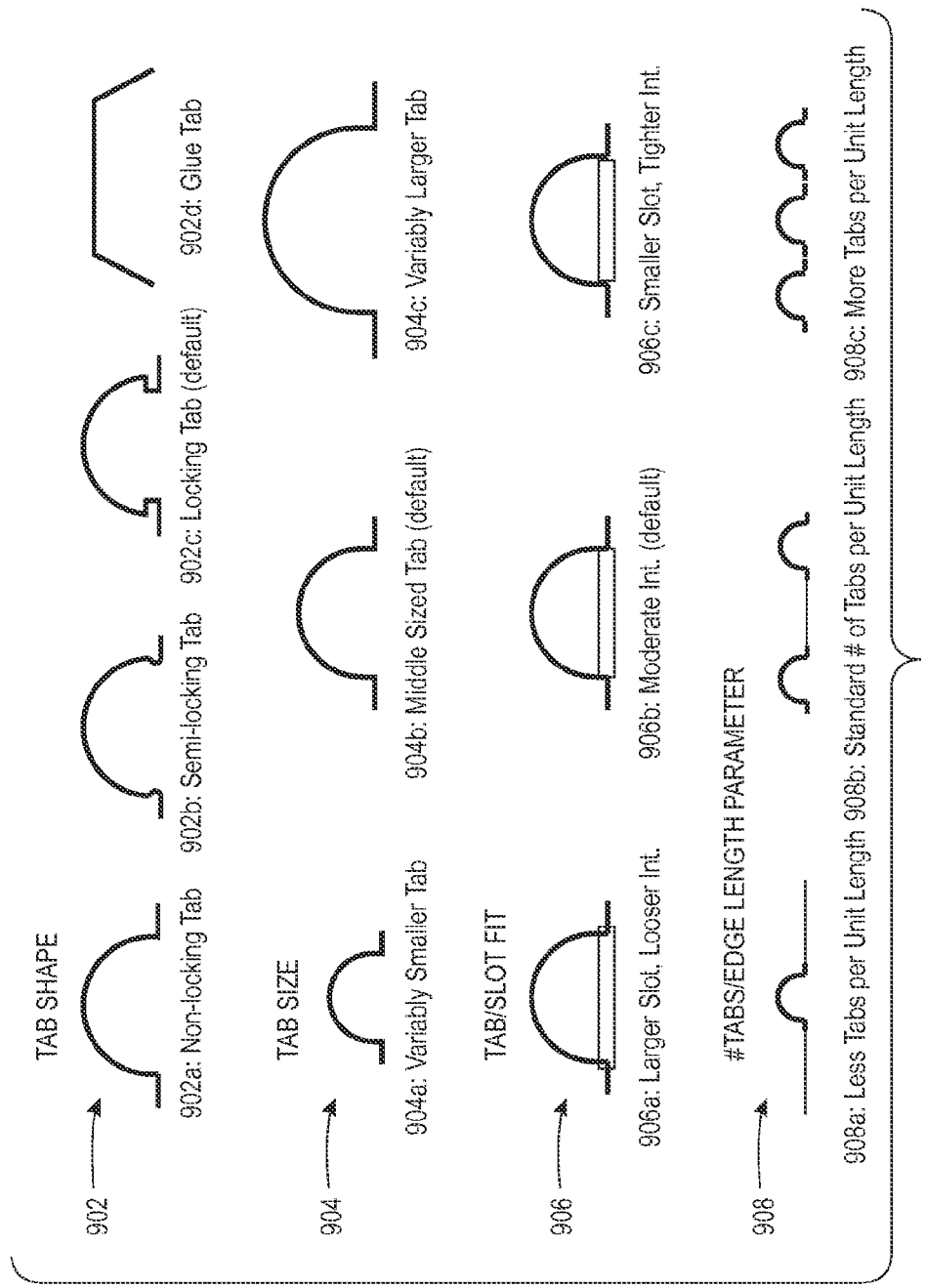
FIG. 9 depicts various tab options according to an embodiment.

For example, as shown in FIG. 9, the package design system can select one or more functional elements from various categories and types of tabs and tab/slot fits based upon the user's specified information. The package design system may store structural and/or dimensional data for each structural element. When designing a specific package, the package design system may access the structural and/or dimensional data for selected functional elements and include the data in the package design. As shown in FIG. 9, selections for the tabs and slots may include various categories, each of which may contribute to one or more overall attributes of the final package design. Each category may include one or more specific types that are related to how that specific category impacts the overall attributes of that physical characteristic.

As shown in FIG. 9, one category may include tab shape 902. The various tabs shapes 902 may include, for example, a non-locking tab 902a, a semi-locking tab 902b, a locking tab 902c and a glue tab 902d. Based upon the package initially selected to design, the tab shape 902 may default to a specific type. For example, as shown in FIG. 9, the locking tab shape 902c may be selected as the default tab shape. However, based upon the user-specified information related to one or more attributes, the package design system may alter the tab shape 902 accordingly. For example, if the user has specified a higher level of ease of assembly, the package design system may select a non-locking tab shape 902a.

Alternatively, if the user has specified a low level of ease of assembly, the package design system may leave the selection as the default locking tab shape 902*c*.

Additionally, multiple attributes may impact the selection of a single category of, for example, tab shape. For example, if a user selects both a low level of ease of assembly and a high level of structural integrity, the package design system may select a glue tab shape 902*d* as that shape may provide a high level of structural integrity while lowering ease of assembly.

The package design system may also select one or more additional attributes of the functional elements associated with one or more physical characteristics based upon the user-specified information without the need for a user to have specific knowledge of the corresponding shapes. Thus, user preferences or packaging desires, as indicated by the user-specified information, can be translated by the package design system to specific design attributes for the related functional elements.

For example, if the package design system selects to use a non-locking tab 902*a*, the package design system may then also select a tab size from various available tab sizes 904 for that type of tab when determining the tab and slot design for a package. As shown in FIG. 9, tab size 904 may include, for example, a variably smaller tab size 904*a*, a middle tab size 904*b*, and a variably larger tab size 904*c*. To determine a particular tab size, the package design system may access the stored dimensional information to determine a standard size tab for that particular package, and adjust according depending upon which of the tab sizes 904 is selected. As before, based upon the type of package initially selected, the design may include a default size. In this example the middle tab size 904*b* may be the default size, thus the package design system may assign the default size to the middle tab size. The variably smaller tab 904*a* may be a certain percentage of the standard size, e.g., 66% of the standard tab size. Thus, the package design system may assign the proportionally smaller size to the variably smaller tab size 904*a*. Similarly, the variably larger tab size 904*c* may be a certain percentage larger than the standard tab size, e.g., 133% of the standard tab size. Thus, the package design system may assign the proportionally larger size to the variably larger tab size 904*c*.

Alternatively, the package design system may determine the standard tab size according to a specific algorithm used for each package being designed. For example, the algorithm may account for the material the package will be constructed of, an intended use of the package and one or more dimensions of the package to determine the standard tab size. The package design system may then determine the tab sizes 904 based upon the determined standard tab size as described above.

Based upon the user-specified information, the package design system may select an alternate tab size 904. For example, if the user selects a lower level of structural integrity, the package design system may select the variably smaller tab size 904*a*. Conversely, if the user selects a higher level of structural integrity, the package design system may select the variably larger tab size 904*c*.

Similarly, the package design system may also select a tab/slot fit structure 906 when determining the tab and slot design for a package. As shown in FIG. 9, tab/slot fit 906 may include, for example, a larger slot size 906*a* having a looser tab interference level (e.g., how much friction is caused by the fitting of the tab into the slot), a moderately sized slot 906*b* having a moderate tab interference level, and a smaller slot size 906*c* having a higher tab interference level. To determine the tab/slot fit 906, the package design system may determine a standard slot size that provides the moderately sized slot 906*b* based upon the selected tab size 904. For example, the standard slot size may be 97.5% of the selected tab size 904, which may provide a moderate level of tab interference. Thus, the package design system may assign the standard slot size to tab/slot fit 906*b*. The looser tab/slot fit 906*a* may be a certain percentage of the standard size, e.g., 105% of the standard slot size. Thus, the package design system may assign the proportionally larger slot size to the looser slot size 906*a*. Similarly, the variably tighter tab size 906*c* may be a certain percentage smaller than the standard slot size, e.g., 90% of the standard tab size. Thus, the package design system may assign the proportionally smaller slot size to the tighter slot size 906*c*.

As before, based upon the type of package initially selected, the design may include a default size. In this example the moderately sized slot 906*b* having a moderate tab interference level for the tab/slot fit may be the default size. Based upon the user-specified information, the package design system may select an alternate tab/slot fit 906*b*. For example, if the user selects a lower level of structural integrity, the package design system may select the looser slot size 906*a* having a looser tab interference level for the tab/slot fit. Conversely, if the user selects a higher level of structural integrity, the package design system may select the tighter slot size 906*c* having a higher tab interference level for the tab/slot fit.

Additionally, the package design system may also select a number of tabs 908 to include along a lateral dimension of a parameter edge when determining the tab and slot design for a package. As shown in FIG. 9, the number of tabs 908 per unit of lateral dimension may include, for example, a smaller number of tabs 908*a* such as one tab per edge or unit of lateral dimension, a medium number of tabs 908*b* such as two tabs per edge or unit of lateral dimension, and a higher number of tabs 908*c* such as three tabs per edge or unit of lateral dimension.

As before, based upon the type of package initially selected, the design may include a default number of tabs per edge or unit of lateral dimension. In this example the medium number of tabs 908*b* per edge or unit of lateral dimension may be the default size. To determine a standard or default number of tabs per edge or unit of lateral dimension, the package design system may access the stored structural and dimensional data to determine the default number of tabs per unit of length to use. Alternatively or additionally, the package system may also dynamically determine the default number of tabs per edge or unit of lateral dimension using an algorithm that determines, for example, a number of tabs per unit of length based upon one or more additional factors such as the material the package will be constructed of and an intended use of the package.

Based upon the user-specified information, the package design system may select an alternate number of tabs 908 per edge or unit of lateral dimension may be the default size. For example, if the user selects a lower level of structural integrity, the package design system may select a smaller number of tabs 908*a* per edge or unit of lateral dimension may be the default size. Conversely, if the user selects a higher level of structural integrity, the package design system may select a higher number of tabs 908*c* per edge or unit of lateral dimension may be the default size.

The package design system may combine the selections of physical characteristics based upon the user-specified information as well. For example, as shown in FIG. 9, if the user has selected a high importance for ease of assembly, the package design system may select a non-locking tab shape 902*a* having a larger size 904*c* and a larger slot size 906*a*, thereby resulting in a lower tab interference. Similarly, the package design system may place a smaller number of tabs 908*a* along an edge, thereby reducing the overall time required for assembling the package. Alternatively, if a user has selected a high importance on assembly permanence and structural integrity, the design system may select glue tabs 902*d* having a variably larger tab size 904*c* (thereby providing a larger area for adhesion) as well as place a larger number of tabs 908*c* along each edge.

It should be noted that FIG. 9 is directed to tabs and slots by way of example only. The package design system may select from a similar set of categories and individual feature types for each physical characteristic of the package being design. For example, the package design system may select from a similar set of categories and feature types for the folds and creases being applied to the package, a lid feature of the package, a bottom assembly of the package, and other similar physical characteristics.

Referring again to FIG. 7, during generation 714 of the detailed design, the design system may define one or more functions for the final product attributes. For example, as shown in FIGS. 3, 4 and 6, the design system may define 716 or alter the functions shown in those figures such that the output of the functions is in line with the user-specified final attribute information. Based upon such a function definition, the design system can determine or calculate the input values that would produce the output associated with the user-specified attributes. Additionally, the design system may define a set of lower and upper limits for each input variable of the functions, so as to ensure that overall package integrity is not sacrificed. For example, a user may specify an ease of assembly level that would prevent the package from maintaining any structural integrity. The design system may define 718 one or more limits such that a scenario where the package would ultimately fail is avoided.

The design system may interpret 720 the final product attribute selections from the limited functions, and calculate 722 a set of design set points that incorporates the sum of the user-specified weights while maintaining any specific constraints associate with the package being designed.

For example, a user may opt to design a cube shaped box for carrying an object having a certain weight. The user may indicate that ease of assembly has a much higher weight than structural integrity. However, the design system may be configured such that it calculates 722 a set of design set points that address the user's concerns (e.g., having a high level of ease of assembly) while still maintaining a package that is structurally sound for carrying the object.

Figures 10, 11:
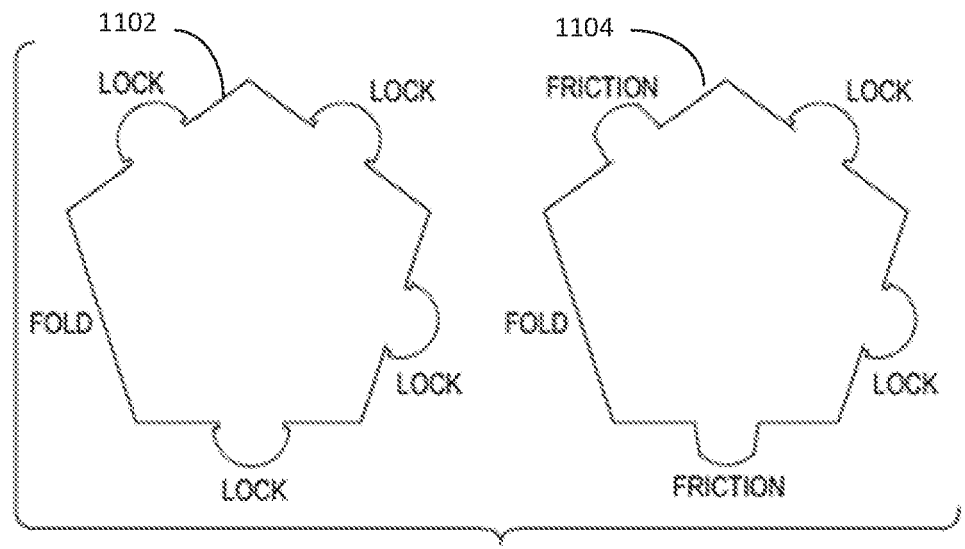
FIG. 10 depicts a design variable coefficient table for a package design according to an embodiment.
FIG. 11 depicts various package designs according to an embodiment.

FIG. 10 illustrates a sample table 1000 for showing how changing a specific attribute 1002 results in changes to structural components 1004 of the package being assembled. For example, as shown in FIG. 10, increasing ease of assembly may result in an increase in tab size while simultaneously reducing the number of tabs. Similarly, increasing assembly permanence may increase tab size and tab/slot interference. Alternatively, lowering ease of assembly may decrease tab/slot interference. Thus, the design system can access a similar coefficient table for each design aspect of a package, and modify those structural elements accordingly based upon the user-received design specifics. It should be noted that the table 1000 as shown in FIG. 10 is for example purposes only to illustrate sample relationships between attributes and corresponding structural components. Actual implementation of the techniques and processes as defined herein may result in additional and/or alternative relationships.

FIG. 11 depicts sample views of a face 1102 and 1104 resulting from varying user input preference information. As shown in face 1102, all included tabs are locking tabs, thereby providing for a more secure and permanent closure of the face. Alternatively, as shown in face 1104, two friction fit tabs are included, thereby reducing the overall permanence of the face, but increasing the ease of assembly. For example, by changing the tab shape, the tab/slot interference may be reduced to zero, but the associated permanence is also directly affected as the tab/slots provide no permanent closure.

It should be noted that the above examples and discussions are directed to tab/slot arrangements by way of example only, and the processes and techniques as described above can be integrated and repeated for each structural and design feature associated with a package being designed. For example, the process as outlined in FIG. 7 may be applied to other structural aspects such as folds (e.g., how easy a fold can be operated), a top face and associated closure, a bottom face and associated closure (e.g., is a closure intended for rare or repeated opening), and other similar features of a package being desig ned.

Figure 12:
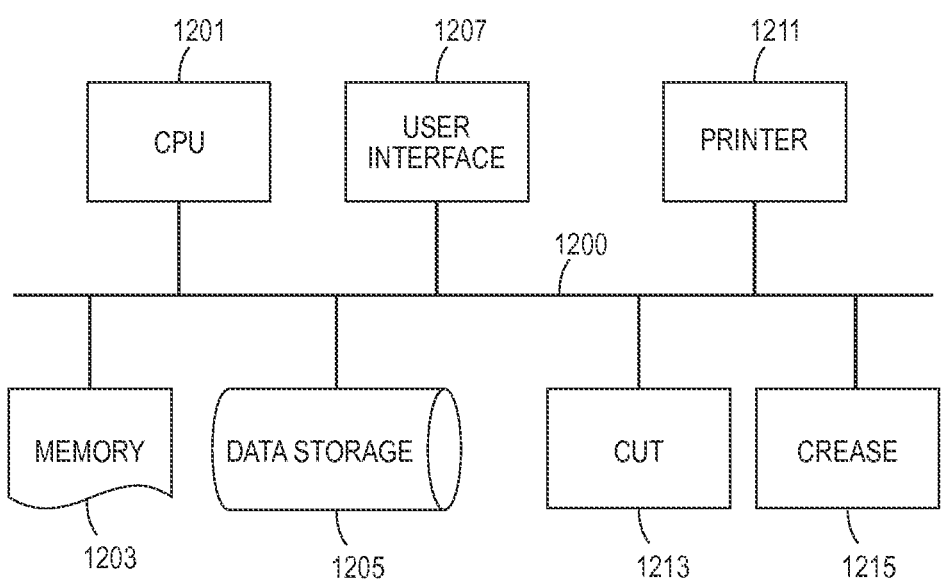
FIG. 12 is a block diagram showing various equipment that may be used to implement various embodiments of the processes described in this document.

FIG. 12 depicts a block diagram of hardware and/or electronics that may make up a package definition and/or production system. One or more communications lines 1200 such as a bus or network interconnect the illustrated components and allow data and/or signals to flow between the components. CPU 1201 represents one or more processor that performs calculations and logic operations required to execute a program. Any number of processors may be available, and they may be part of a single electronic device or distributed across any number of networked electronic devices. When this document and its claims uses the term "processor," then unless specifically stated otherwise it is intended to refer to all such embodiments (i.e., single processor or multiple processors). The processor(s) may access a computer-readable memory device 1203 containing programming instructions, along with a data storage facility 1205 such as a database that stores the package generation templates and/or rule sets.

A user interface 1207 is a device or system that provides output to, and receives input from, a user. The user interface may include a display, audio output, a printer, or another element that provides information to a user. The user interface 1207 also may include a touch-sensitive component, microphone, audio port, keyboard, mouse, touch pad, or other input mechanism that is capable of receiving user input.

The system also may include a package generation device, which may include some or all of the following elements: a printer 1211, a knife or other cutting device 1213, and a roller or other device 1215 capable of imparting a crease in a substrate.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of creating a package design comprising a two-dimensional representation of a three-dimensional structure having a plurality of facets, the method comprising:
by a processor:
receiving an indication of an initial package design;
receiving preference information related to a shape of the initial package design, the preference information comprising user-specified information related to one or more levels of one or more structural attributes of the initial package design;
generating a detailed design that incorporates implementation of the user-specified information, wherein the generating comprises:
automatically identifying a plurality of functional elements associated with the three-dimensional structure that correspond to the user-specified information related to one or more levels of one or more structural attributes,
for at least one of the identified functional elements, altering at least one physical characteristic based upon at least a portion of the preference information, wherein the altering comprises altering a tab and slot design associated with the initial package design,
incorporating the at least one altered physical characteristic into the detailed design,
determining whether the detailed design meets one or more constraint conditions associated with the initial package design,
if the detailed design meets the one or more constraint conditions, maintaining the at least one altered physical characteristic, and
if the detailed design does not meet the one or more constraint condition, omitting the at least one altered physical characteristic from the detailed design; and
generating a detailed design file based upon the detailed design; and
causing a package generation system to use the detailed design file to apply cut lines and fold lines to a substrate to yield a package with the functional elements.

2. The method of claim 1, wherein altering a tab and slot design comprises:
determining a tab shape and size based upon the incorporated at least a portion of the preference information;
determining a desired tab and slot fit based upon the incorporated at least a portion of the preference information;
determining a slot size based upon the determined tab shape, size and desired tab and slot fit; and
determining a tab and slot spacing based upon the incorporated at least a portion of the preference information.

3. The method of claim 1, wherein receiving the preference information further comprises receiving one or more relative importance weights for one or more of the structural attributes of the initial package design.

4. The method of claim 3, wherein generating the detailed design comprises defining one or more functions for determining final product attributes based upon at least one of the user-specified information related to one or more finishing levels and the user-specified input information defining one or more relative importance weights.

5. The method of claim 4, wherein the generating a detailed design further comprises defining lower and upper limits for each input variable for the one or more functions, the lower and upper limits being defined based upon at least one of the user-specified information related to one or more finishing levels and the user-specified input information defining one or more relative importance weights.

6. The method of claim 5, further comprising calculating a set of design points that incorporates a sum of the relative importance weights.

7. The method of claim 6, wherein the set of design points are determined such that the package design satisfies any constraints associated with a type of package being designed.

8. A method comprising:
by a processor, causing to be displayed, on a display operably connected to the processor, a user interface related to a design of a three-dimensional structure, the user interface comprising:
a user-selectable area for altering one or more levels of one or more structural attributes of a package to be designed, and
a user-selectable area for altering one or more importance weights associated with each of the one or more structural attributes;
receiving an indication of an initial package design from a user accessing the user interface;
receiving preference information related to a shape of the initial package design from the user, the preference information comprising:
user-specified information related to the one or more levels of one or more structural attributes of the initial package design and user-specified information related to one or more importance weights;
creating a package design comprising a two-dimensional representation of the three-dimensional structure having a plurality of facets by:
generating a detailed design that incorporates implementation of the user-specified information, wherein the generating comprises:
automatically identifying a plurality of functional elements associated with the three-dimensional structure that correspond to the user-specified information related to one or more levels of one or more structural attributes,
for at least one of the identified functional elements, altering at least one physical characteristic based upon at least a portion of the preference information, wherein the altering comprises altering a tab and slot design associated with the initial package design,
incorporating the at least one altered physical characteristic into the detailed design,
determining whether the detailed design meets one or more constraint conditions associated with the initial package design,
if the detailed design meets the one or more constraint conditions, maintaining the at least one altered physical characteristic in the detailed design, and
if the detailed design does not meet the one or more constraint conditions, omitting the at least one altered physical characteristic from the detailed design;
generating a detailed design file based upon the detailed design; and
causing a package generation system to use the detailed design file to apply cut lines and fold lines to a substrate to yield the package with the identified functional elements.

9. The method of claim 8, wherein receiving the preference information further comprises receiving one or more relative importance weights for one or more of the structural attributes of the initial package design.

10. The method of claim 9, wherein generating the detailed design comprises defining one or more functions for determining final product attributes based upon at least one of the user-specified information related to one or more finishing levels and the user-specified input information defining one or more relative importance weights.

11. The method of claim 10, wherein the generating a detailed design further comprises defining lower and upper limits for each input variable for the one or more functions, the lower and upper limits being defined based upon at least one of the user-specified information related to one or more finishing levels and the user-specified input information defining one or more relative importance weights.

12. The method of claim 11, further comprising calculating a set of design points that incorporates a sum of the relative importance weights, wherein the set of design points are determined such that the package design satisfies any constraints associated with a type of package being designed.

13. A system for creating a package design comprising a two-dimensional representation of a three-dimensional structure having a plurality of facets, the system comprising:
a processor;
a package generation system comprising a cutting device and a device configured to impart a crease; and
a non-transitory computer readable medium in communication with the processor, the non-transitory computer readable medium comprising one or more programming instructions for causing the processor to:
receive an indication of an initial package design,
receive preference information related to a shape of the initial package design, the preference information comprising user-specified information related to one or more levels of one or more structural attributes of the initial package design,
generate a detailed design that incorporates implementation of the user-specified information, wherein the one or more programming instructions for generating the detailed design further comprise one or more instructions for causing the processor to:
automatically identify a plurality of functional elements associated with the three-dimensional structure that correspond to the user-specified information related to one or more levels of one or more structural attributes,
for at least one of the identified functional elements, alter at least one physical characteristic based upon at least a portion of the preference information, wherein the altering comprises altering a tab and slot design associated with the initial package design,
incorporate the at least one altered physical characteristic into the detailed design,
determine whether the detailed design meets one or more constraint conditions associated with the initial package design,
if the detailed design meets the one or more constraint conditions, maintain the at least one altered physical characteristic, and
if the detailed design does not meet the one or more constraint condition, omit the at least one altered physical characteristic from the detailed design, and generate a detailed design file based upon the detailed design, wherein the detailed design file contains instructions configured to cause the package generation system to use the detailed design file to apply cut lines and fold lines to a substrate to yield a package with the identified functional elements.

14. The system of claim 13, wherein one or more programming instructions for causing the processor to receive the preference information further comprises one or more programming instructions for causing the processor to receive one or more relative importance weights for one or more of the structural attributes of the initial package design.

15. The system of claim 14, wherein one or more programming instructions for causing the processor to generate the detailed design comprise one or more programming instructions for causing the processor to define one or more functions for determining final product attributes based upon at least one of the user-specified information related to one or more finishing levels and the user-specified input information defining one or more relative importance weights.

16. The system of claim 15, wherein the one or more programming instructions for causing the processor to generate a detailed design further comprise one or more programming instructions for causing the processor to define lower and upper limits for each input variable for the one or more functions, the lower and upper limits being defined based upon at least one of the user-specified information related to one or more finishing levels and the user-specified input information defining one or more relative importance weights.

17. The system of claim 16, further comprising one or more programming instructions for causing the processor to calculate a set of design points that incorporates a sum of the relative importance weights.

18. The system of claim 17, wherein the set of design points are determined such that the package design satisfies any constraints associated with a type of package being designed.

19. A method of creating a package design comprising a two-dimensional representation of a three-dimensional structure having a plurality of facets, the method comprising:
by a processor:
receiving an indication of an initial package design;
receiving preference information related to a shape of the initial package design, the preference information comprising:
user-specified information related to one or more levels of one or more structural attributes of the initial package design, and
one or more relative importance weights for one or more of the structural attributes of the initial package design;
generating a detailed design that incorporates implementation of the user-specified information, wherein the generating comprises:
automatically identifying a plurality of functional elements associated with the three-dimensional structure that correspond to the user-specified information related to one or more levels of one or more structural attributes,
for at least one of the identified functional elements, altering at least one physical characteristic based upon at least a portion of the preference information,
incorporating the at least one altered physical characteristic into the detailed design, determining whether the detailed design meets one or more constraint conditions associated with the initial package design, if the detailed design meets the one or more constraint conditions, maintaining the at least one altered physical characteristic, and if the detailed design does not meet the one or more constraint condition, omitting the at least one altered physical characteristic from the detailed design; and generating a detailed design file based upon the detailed design by:

defining one or more functions for determining final product attributes based upon at least one of the user-specified information related to one or more finishing levels and the user-specified input information defining one or more relative importance weights, and defining lower and upper limits for each input variable for the one or more functions, the lower and upper limits being defined based upon at least one of the user-specified information related to one or more finishing levels and the user-specified input information defining one or more relative importance weights; and causing a package generation system to use the detailed design file to apply cut lines and fold lines to a substrate to yield a package with the functional elements.

20. The method of claim 19, further comprising calculating a set of design points that incorporates a sum of the relative importance weights.

21. The method of claim 20, wherein the set of design points are determined such that the package design satisfies any constraints associated with a type of package being designed.

* * * * *